United States Patent [19]

Preston

[11] 4,131,340

[45] Dec. 26, 1978

[54] ADJUSTABLE EYEGLASS TEMPLE

[76] Inventor: Sidney Preston, 410 Parkside Ct., Copiague, N.Y. 11726

[21] Appl. No.: 757,905

[22] Filed: Jan. 10, 1977

[51] Int. Cl.² .............................................. G02C 5/20
[52] U.S. Cl. .................................... 351/118; 351/111; 351/121; 351/123
[58] Field of Search ................. 351/118, 121, 19, 111, 351/123

[56] References Cited

U.S. PATENT DOCUMENTS

| 3,052,161 | 9/1962 | Berend | 351/118 |
| 3,189,912 | 6/1965 | Miller | 351/118 |
| 3,271,094 | 9/1966 | Wildermuth | 351/118 |
| 3,544,204 | 12/1970 | Brenenfeld | 351/118 |
| 3,873,192 | 3/1975 | Anderson | 351/118 |

Primary Examiner—Paul A. Sacher

[57] ABSTRACT

A temple rotatably mounted on an eyepiece of an eyeglass frame by a hinge is adjustable in length relative to the eyepiece for the purpose of adjusting the maximum degree of rotation of the temple to permit the adjustment of the temple to conform to the dimensions of the wearer's head by pushing the temple relative to the hinge. The temple has a slot receiving therethrough a pair of pins mounted on the hinge. The pins are connected at their outer ends to a resilient clamp plate which clamps the adjusted temple to the hinge.

7 Claims, 3 Drawing Figures

ADJUSTABLE EYEGLASS TEMPLE

BACKGROUND OF THE INVENTION

This invention relates to eyeglass frames, and more particularly, to means for attaching the temples to the eyepiece of the frame so the temples can be rapidly and accurately fitted to the wearer's head.

Opticians fit eyeglass frames to the individual by heating and manually bending and twisting the temples to accommodate the measurements and contours of the wearer's head. This is a time-consuming chore for both the optician and wearer and does not permit further adjustment after a period of wear. Accordingly, this invention provides means for quickly adjusting the temples without bending or twisting of the temples and may be accomplished by the wearer without any professional assistance.

SUMMARY OF THE INVENTION

In accordance with the invention, a pair of pins are provided on the hinge between each temple and eyepiece which extend through an elongated slot in the temple. The pins are integrally connected to a resilient S-shaped spring steel plate having a sharpened front edge. The temple length relative to the eyepiece is adjusted for the purpose of limiting the maximum degree of rotation of the temple relative to the eyepiece by simply pushing the temple towards the eyepiece, the plate retaining and clamping the temple to the hinge in adjusted relation. Vertical ridges or serrations on the front surface of the temple cooperate with the front edge of the plate to prevent slippage of the adjusted temple relative to the eyepiece.

BRIEF DESCRIPTION OF THE DRAWING

Further objects and advantages of the invention will become apparent from the following description and claims, and from the accompanying drawings, wherein:

DETAILED DESCRIPTION OF THE PREFERRED EMBODIMENT

Figure 1:
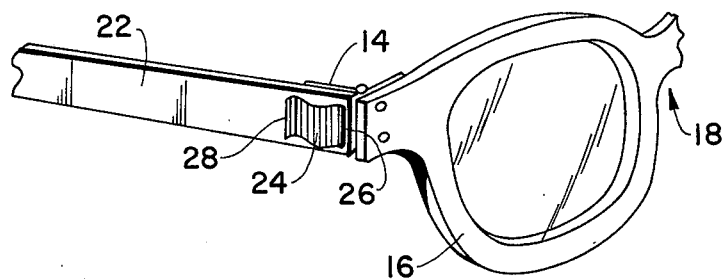
FIG. 1 is a fragmentary front perspective view of an eyeglass frame provided with the adjustment means of the present invention.
Figure 2:
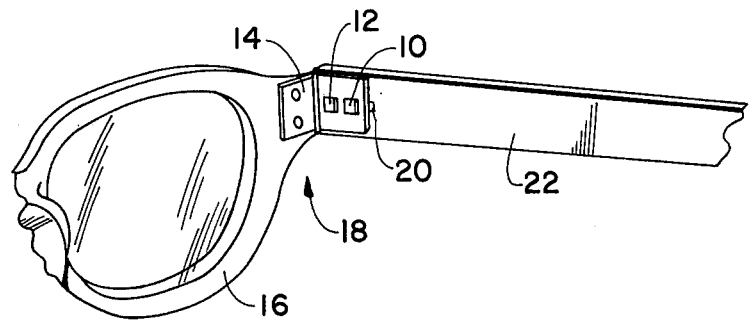
FIG. 2 is a fragmentary back perspective view of the eyeglass frame of FIG. 1.
Figure 3:
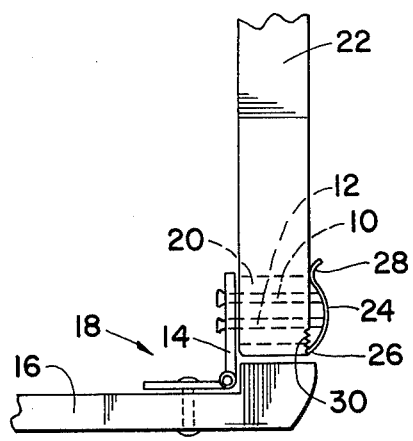
FIG. 3 is a fragmentary top plan view of one of the temples and eyepiece of the frame of FIGS. 1 and 2.

Referring now in detail to the drawing, wherein like numerals indicate like elements throughout the several views, a pair of pins 10, 12 are provided on the hinge 14 connected to the eyepiece 16 of an eyeglass frame 18. Pins 10, 12 pass through an elongated slot 20 in a temple 22 of a width equal to or slightly greater than the diameter of the pins to prevent vertical movement of the temple 22 relative to eyepiece 16. After passing through slot 22, the pins 10, 12 are connected in any conventional manner, such as swaging, to a resilient S-shaped spring steel plate 24 having a sharpened front edge 26.

Because of the arrangement of the elements heretofore described, the distance from eyepiece 16 of temple 22 can be adjusted by simply pushing the temple 22 towards eyepiece 16, the rear end 28 of plate 24 being curved to facilitate such movement. Once in adjusted position, the temple 22 is clamped to hinge 14 by plate 24.

Vertical ridges or serrations 30 on the front surface of temple 22 cooperate with the front edge 26 of plate 24 to prevent slippage of the adjusted temple 22 relative to eyepiece 16.

I claim:

1. An eyeglass frame comprising:
   an eyepiece;
   a pair of temples, each of said temples adapted to be mounted at one end of said eyepiece, whereby each of said temples have one surface facing one another and an external surface, each of said external surfaces of said temples having a plurality of vertical ridges near said eyepiece;
   hinge means for rotatably connecting each of said temples to said eyepiece;
   means between each of said temples and said hinge means for adjustably mounting said temple on said hinge means to vary the length of said temple relative to said eyepiece, said means including
   an elongated slot in said temple,
   pin means having one end mounted on said hinge means passing through said slot, and
   resilient clamp means fixed to the other end of said pin means and engaging said vertical ridges on said temple, for clamping said temple to said hinge means.

2. The eyeglass frame of claim 1 wherein said resilient clamp means includes an S-shaped plate.

3. The eyeglass frame of claim 2, wherein said S-shaped plate includes a sharpened front edge adapted to be received between adjacent ones of said ridges.

4. The eyeglass frame of claim 3 wherein said S-shaped plate includes a curved end portion.

5. The eyeglass frame of claim 4 wherein said slot is formed in said temple.

6. The eyeglass frame of claim 5 wherein said pin means includes a pair of cylindrical pins.

7. The eyeglass frame of claim 6 wherein the width of said slot is approximately equal to the diameter of said pins.

* * * * *